(No Model.)
2 Sheets—Sheet 1.
E. L. HARRIS.
COTTON SEED PLANTER.
No. 419,330.
Patented Jan. 14, 1890.
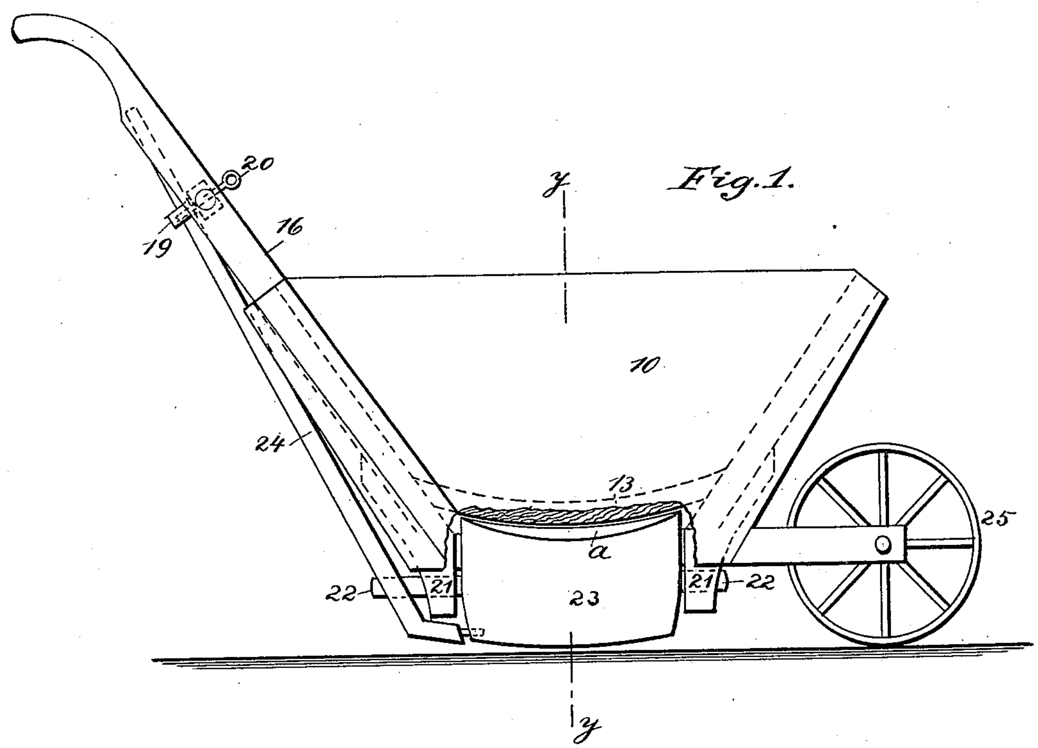
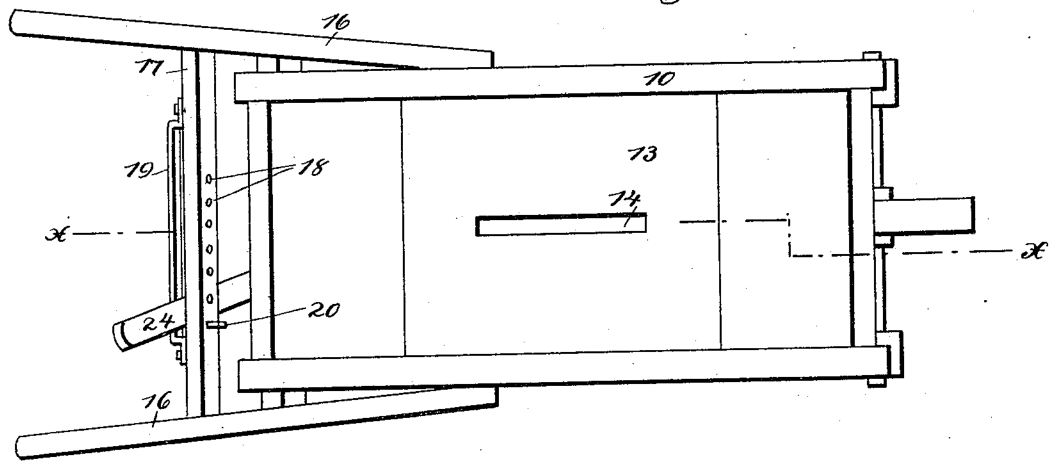
WITNESSES:
D. C. Reusch.
C. Sedgwick
INVENTOR:
E. L. Harris
BY Munn & Co
ATTORNEYS.
N. PETERS. Photo-Lithographer, Washington, D. C.

(No Model.)
2 Sheets—Sheet 2.
E. L. HARRIS.
COTTON SEED PLANTER.
No. 419,330.
Patented Jan. 14, 1890.
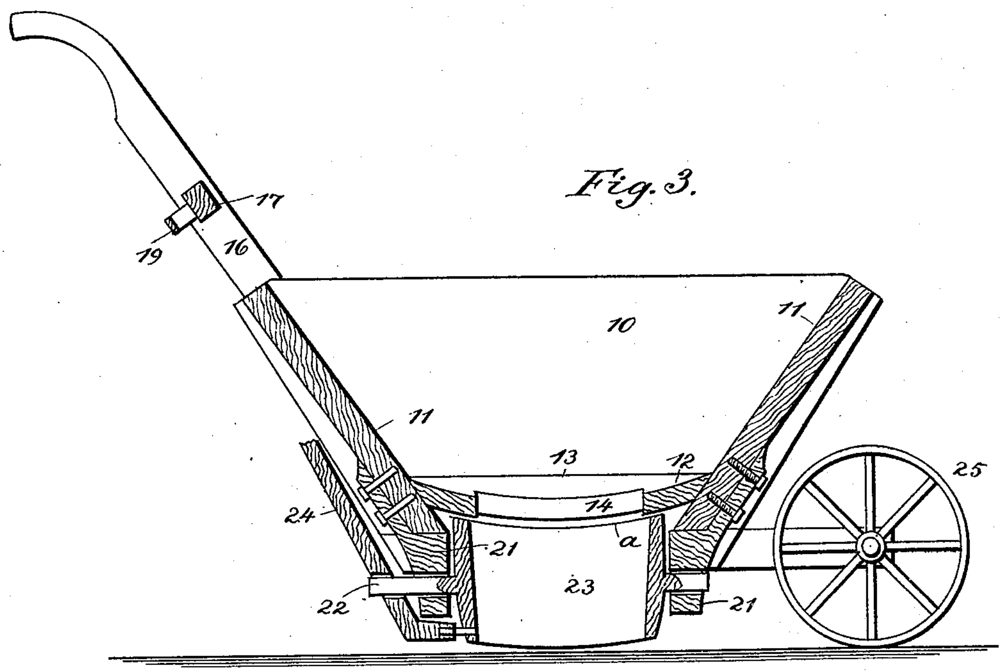
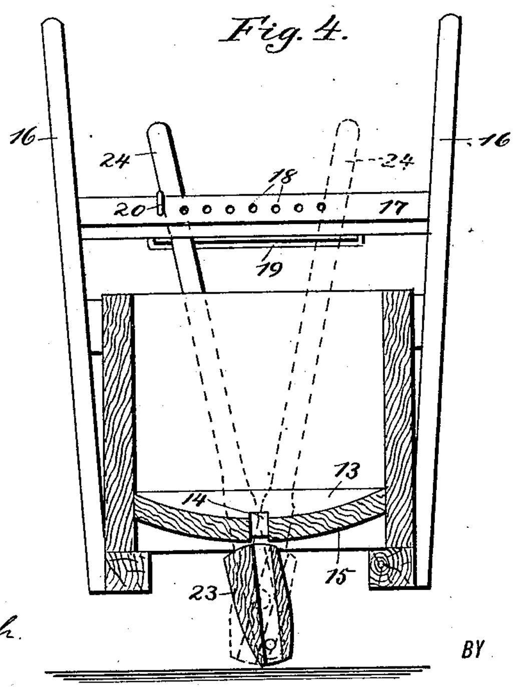
WITNESSES:
D. C. Reusch.
C. Sedgwick
INVENTOR:
E. L. Harris
BY Munn & Co
ATTORNEYS.
N. PETERS. Photo-Lithographer, Washington, D. C.

UNITED STATES PATENT OFFICE.

EDWARD L. HARRIS, OF RED BANKS, MISSISSIPPI.

COTTON-SEED PLANTER.

SPECIFICATION forming part of Letters Patent No. 419,330, dated January 14, 1890.

Application filed May 14, 1889. Serial No. 310,693. (No model.)

*To all whom it may concern:*

Be it known that I, EDWARD L. HARRIS, of Red Banks, in the county of Marshall and State of Mississippi, have invented a new and useful Improvement in Cotton-Seed Planters, of which the following is a full, clear, and exact description.

My invention relates to an improvement in cotton-seed planters and implements of like character, and has for its object to provide a means whereby the seed or fertilizer carried by the implement may, at the pleasure of the operator, be delivered directly into the hill or furrow adapted to receive the same; and a further object of the invention is to provide a means whereby the operator may at any time stop the flow of the material from the implement, thereby economizing in the said material when moving the implement to different parts of the farm and when turning at the end of a row.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1 is a side elevation of the implement, partly broken away upon the side presented. Fig. 2 is a plan view. Fig. 3 is a longitudinal section taken partially on line $x$ $x$ of Fig. 2; and Fig. 4 is a transverse section taken partially on line $y$ $y$ of Fig. 1.

In carrying out the invention the body of the implement consists, usually, of two side pieces 10, united by downwardly and inwardly inclined end pieces 11, whereby a hopper shape is imparted to the said body, and the bottom 12 of the body is preferably dished or concaved, as illustrated at 13, and provided in the center of the said dished or concaved surface with a longitudinal slot or opening 14. The under face of the bottom 12 is usually convexed, as shown at 15 in Fig. 4.

To the sides of the body, near one end, handles 16 are secured, which handles project upward beyond the body, being united by a suitable cross-bar 17, provided with a series of longitudinally-arranged apertures 18, as best shown in Fig. 2. Upon the back of the cross-bar 17 a yoke-like strap-plate 19 is rigidly secured, and the apertures 18 are adapted to receive a pin 20 or equivalent device, for a purpose hereinafter set forth.

Upon the lower edge of each of the end pieces 11 of the body a bracket 21 is rigidly attached, in which brackets the trunnions 22 of a boot or delivery-chute 23 are journaled, as best illustrated in Fig. 3. The boot or chute 23 is provided with a vertical bore or channel, the walls of which are preferably rectangular, and the upper edge of the said boot or chute is concaved, as illustrated at *a* in Fig. 3, whereby it will adapt itself to the convex surface of the bottom of the body. The upper surface of the boot or chute approaches the bottom of the body of the implement sufficiently to prevent a waste of material and to admit of a lateral movement of the chute in its bearings. The normal position of the chute when the channel therein is in registry with the slot in the body is slightly inclined sidewise, as illustrated in Fig. 4, and when in this position the chute may be made to extend vertically downward, if so desired.

The chute or boot is of sufficient length to essentially contact with the ground, thereby preventing the wind from blowing away the seed or other material to be delivered to the ground when the implement is in operation. The chute is laterally reciprocated by a rod or handle 24, secured to the projecting end of the rear trunnion 22 of said chute, the lower end of the said rod or handle being preferably inclined forward to a rigid contact with the rear end of the chute, as illustrated in Fig. 1. The upper end of the shifting-rod 24 passes upward in contact with the rear face of the cross-bar 17 and between said cross-bar and the opposed face of the strap-plate 19.

The body of the implement is usually supported by a wheel or wheels 25, preferably located at the front; but the said wheels may be journaled upon the sides, if in practice it is found advisable.

In operation, when the shifting-rod 24 is carried in one direction, the chute or boot is given such a lateral inclination, as shown in dotted lines in Fig. 4, that one upper edge of the chute will effectually cover the opening 14 in the body. To that end the chute is wider at the upper end upon one side of the channel than upon the other. When the shifting-rod is carried in the opposite direction the channel in the chute registers with the opening in the body, as shown in positive lines in Fig. 4, and the material in said body is enabled to find a ready exit to the ground. The advantage of this construction is obvious, inasmuch as when the end of the row is reached the supply may be instantly cut off, and can be quickly turned on again when the implement has been brought in position to plant another row. The supply of material to be delivered from the implement is also under the control of the operator, since by placing the pin 20 in any of the apertures 18 in the cross-bar 17 the opening in the body will be only partially disclosed when the shifting-bar is manipulated to cause the channel in the chute to register with the said body-opening. Thus if the pin is placed in one of the apertures near the center of the cross-bar the body-opening will be but very slightly uncovered, and if placed in an end aperture the said opening will be almost entirely disclosed.

The device is especially adapted for distributing fertilizer and for attachment to what is known as the "Dowlaw Planter," or other planter of similar type.

Having thus described my invention, I claim as new and desire to secure by Letters Patent—

1. In a cotton-seed planter or similar implement, the combination, with a body provided with an opening in the bottom thereof, of a chute or boot fulcrumed beneath the said body, and means, substantially as shown and described, for laterally reciprocating the chute or boot to close or to uncover the body-opening, as and for the purpose specified.

2. In a cotton-seed planter or similar implement, the combination, with a body provided with a slot in the bottom thereof, of a boot or chute fulcrumed beneath the said body, and a shifting-rod attached to the said body and leading upwardly therefrom, substantially as shown and described, whereby when the shifting-rod is manipulated the boot will be laterally reciprocated to cover or to uncover the opening in the body, as set forth.

3. In a cotton-seed planter or similar implement, the combination, with a body provided with a bottom having an inner concaved surface, an outer convexed surface, and a slot produced at or near its center, of a chute or boot fulcrumed beneath the body provided with an upper concaved edge of greater thickness at one side than at the other, and a shifting-rod attached to said boot or chute and leading upward beyond the body, all combined for operation substantially as shown and described.

4. In a cotton-seed planter or equivalent implement, the combination, with a body having downwardly and inwardly inclined sides, and a bottom having an inner concaved face, an outer convexed face, and a central opening, handles secured to the body, an apertured cross-bar connecting the handles, a pin capable of insertion in the apertures in the cross-bar, and a yoke-like strap attached to the rear face of the said cross-bar, of a boot or chute provided with trunnions journaled beneath the bottom of the body, having a concaved upper surface of greater width at one side than at the other, and a shifting-bar attached to one trunnion of the boot and leading upward between the yoke and handled cross-bar, all combined for operation substantially as and for the purpose specified.

EDWARD L. HARRIS.

Witnesses:
JAMES FORT,
H. O. RAND.